Feb. 22, 1949.    E. DANNER    2,462,808
MANUFACTURE OF TUBULAR GLASSWARE
Filed July 16, 1945    4 Sheets-Sheet 1

INVENTOR
Edward Danner

Feb. 22, 1949.                    E. DANNER                    2,462,808
                     MANUFACTURE OF TUBULAR GLASSWARE
Filed July 16, 1945                                    4 Sheets-Sheet 2
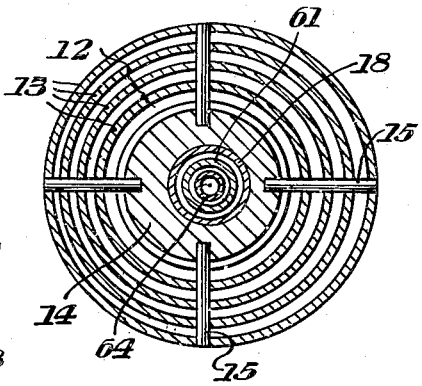
Fig.1A.
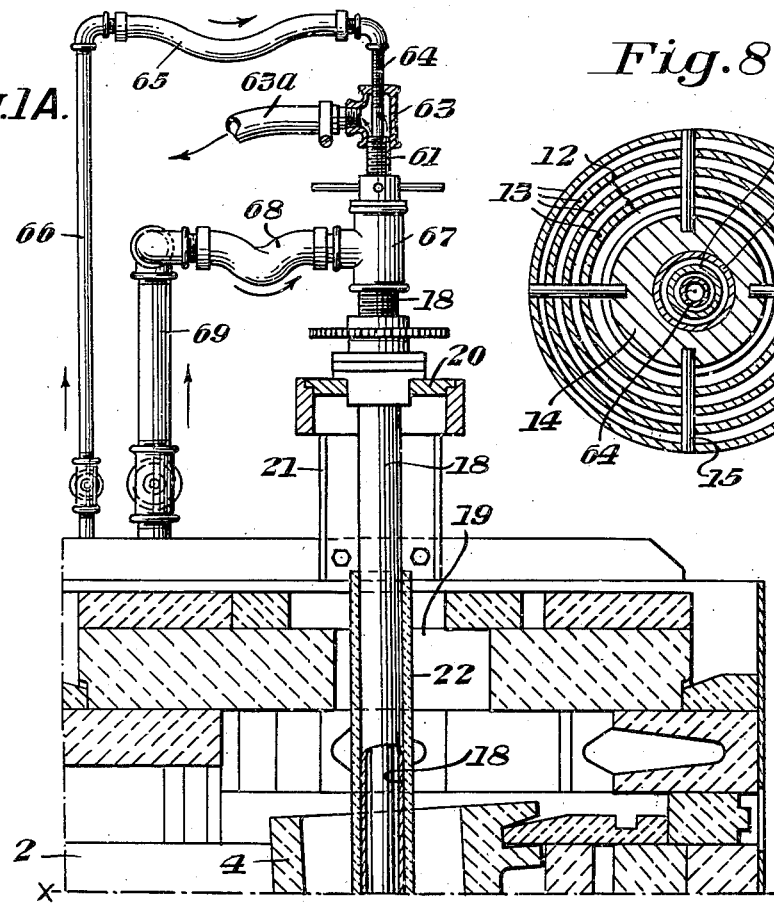
Fig.8.
Fig.9.         Fig.10.  Fig.11.
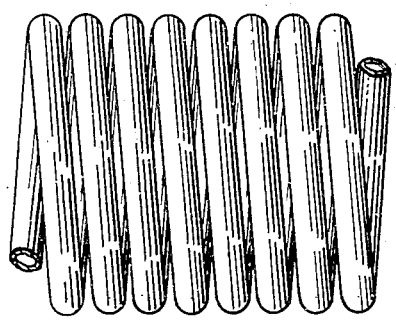    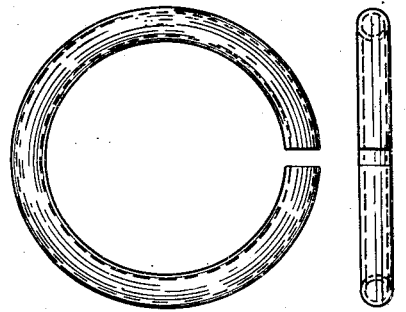
INVENTOR
Edward Danner Feb. 22, 1949.   E. DANNER   2,462,808
MANUFACTURE OF TUBULAR GLASSWARE
Filed July 16, 1945   4 Sheets-Sheet 3

INVENTOR
Edward Danner

Feb. 22, 1949.  E. DANNER  2,462,808
MANUFACTURE OF TUBULAR GLASSWARE
Filed July 16, 1945  4 Sheets-Sheet 4
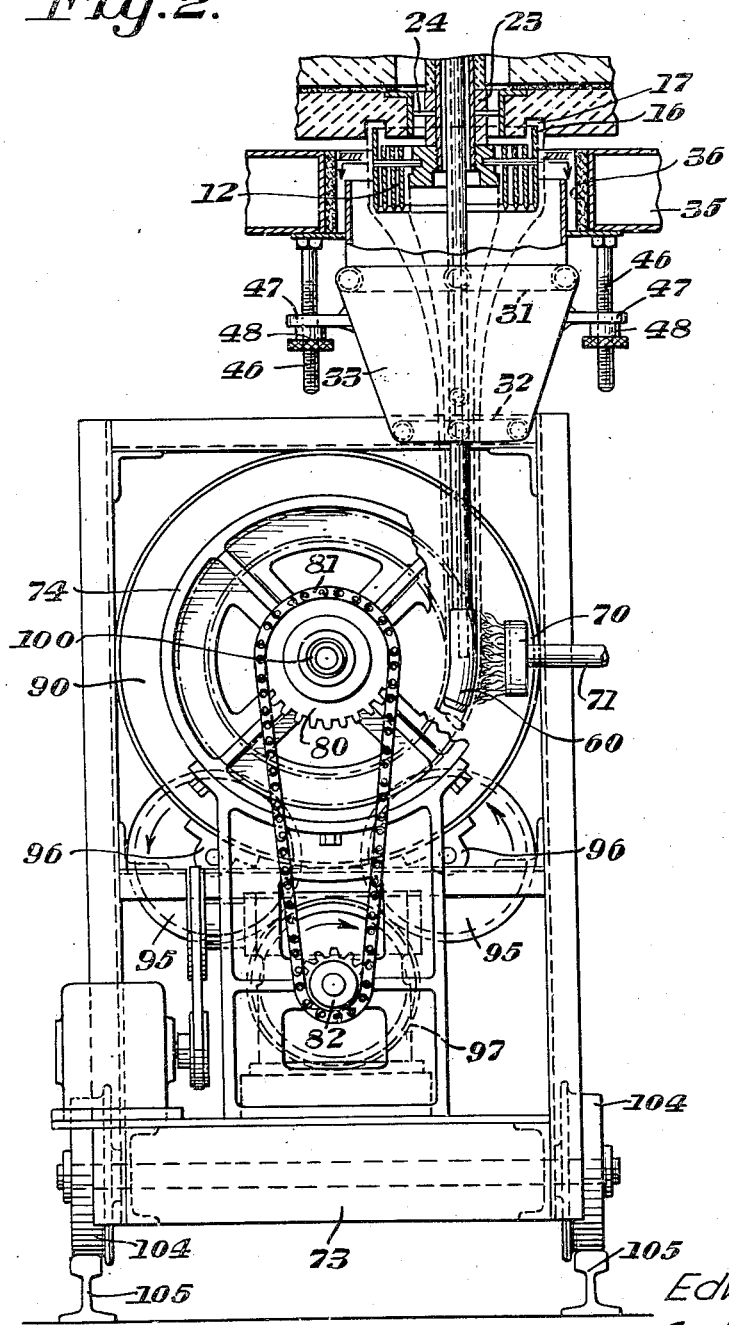
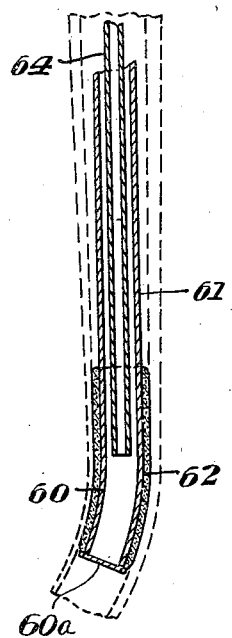
INVENTOR
Edward Danner Patented Feb. 22, 1949

2,462,808

UNITED STATES PATENT OFFICE 2,462,808

MANUFACTURE OF TUBULAR GLASSWARE

Edward Danner, Newark, Ohio

Application July 16, 1945, Serial No. 605,335

14 Claims. (Cl. 49—1)

The present invention relates to the manufacture of glassware, and more particularly to the manufacture of glassware in spiral form. It provides an apparatus whereby glassware, which may be either solid or tubular, may be made in spiral form economically, at relatively high speed and with a high degree of uniformity as regards the diameter of the coil and the wall thickness where tubular glassware is formed.

Heretofore spiral glass tubing has been made by reheating tubing made in the regular way and then bending it into spiral form. It is quite obvious that this is a slow, expensive method of production and, as a consequence, the application of glass tubing in spiral form to its various uses has been greatly limited. Moreover, the bending of straight tubing into spiral form is limited to the smaller sizes as it is difficult to bend the larger sizes and maintain the tubing round in cross section and of uniform wall thickness.

By the present invention I have provided apparatus whereby spiral tubing may be made direct from the shaping element before the glass has become set, thereby eliminating the many intermediate steps required by the present practices as stated above. In view of the limitations on the presently known processes and their elimination by the method and apparatus which I provide, it is obvious that this invention will open new fields for the use of tubing of this character. For example, the spiral tubing, when cooled, can be cut in single or multiple sections for use in the manufacture of fluorescent lighting apparatus. This form of lamp would have many distinct advantages over the present type of fluorescent light embodying long, straight lighting tubes. For example, for houselighting fixtures it will be far more desirable to have the fluorescent tube in circular form than to have it in the form of a long, straight tube.

In carrying out my invention, the molten glass is passed from the melting apparatus to a shaping element which preliminarily shapes the molten glass into ware form. The glass continues in its downward path and, in the case of the larger sizes, it passes over a sizing member which imparts the desired internal cross section to the tube and curves it so as to facilitate the winding of it spirally upon a receiving drum. The glass is wound spirally on the drum and is then preferably transported through a suitable annealing lehr. At the end of the lehr it may be cut to size and handled in any desired way.

In the accompanying drawings I have shown my invention as applied to the manufacture of spiral tubular ware. My invention is particularly valuable in the manufacture of such ware but it can be applied to the manufacture of solid spiral ware, the glass as it is spirally wound on the drum being in solid or cane form.

In the drawings,

Fig. 1A is a partial vertical section through the portion of the forehearth above that portion shown in Fig. 1;

Fig. 2 is a view partly in elevation and partly in section taken at right angles to the view shown in Fig. 1;

Fig. 7 is an enlarged longitudinal section through the sizer shown in Fig. 2;

Fig. 8 is a horizontal cross section taken along the line VIII—VIII of Fig. 2;

Fig. 9 is a side elevational view of a coil of tubing made in accordance with my invention;

Fig. 10 is an end elevation showing one of the turns of tubing made by my invention; and Fig. 11 is an elevational view of the ring shown in Fig. 10 taken at right angles to Fig. 10.

Figure 1:
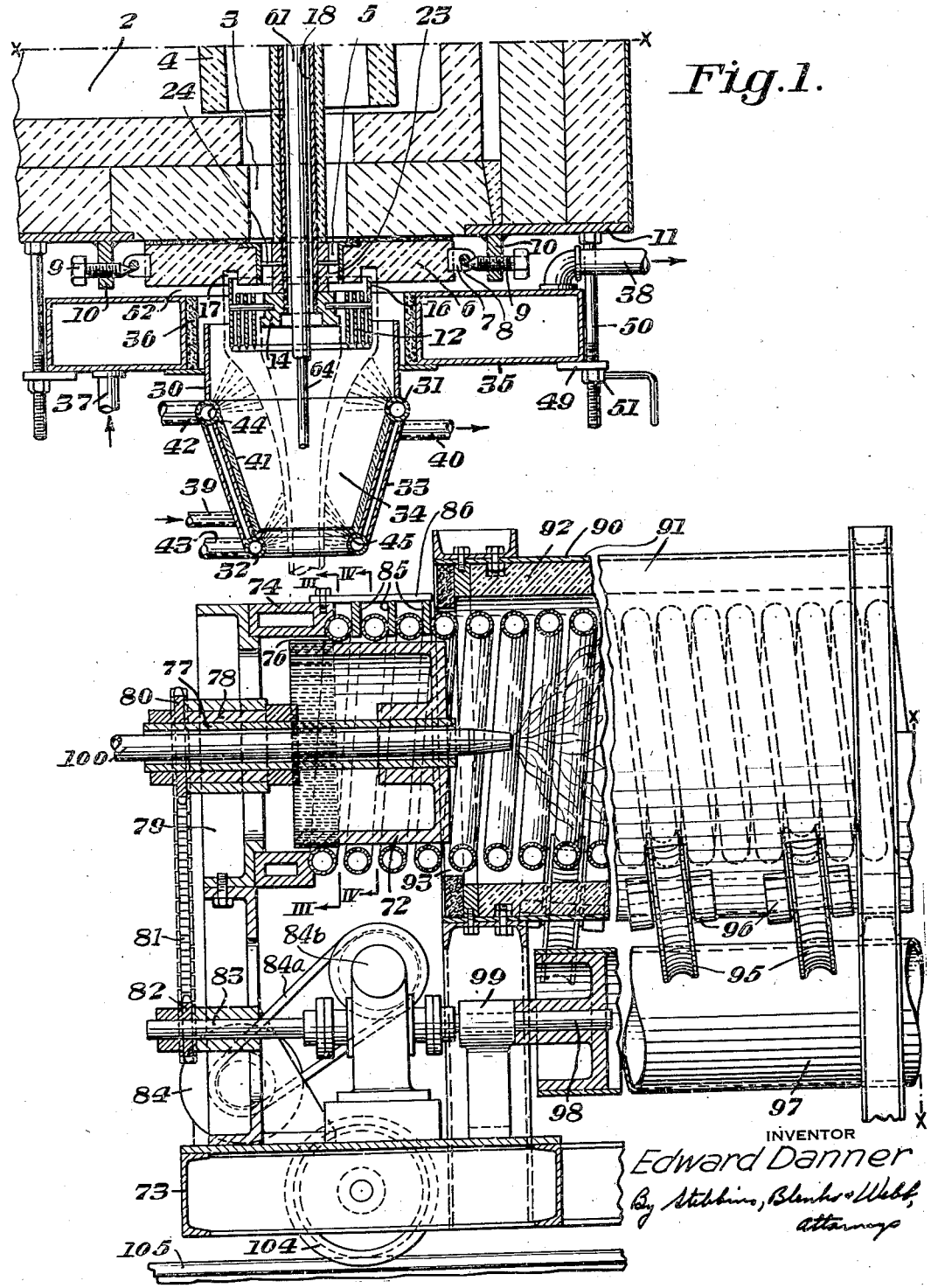
Fig. 1 is a partial vertical section through apparatus embodying my invention.
Figure 1B:
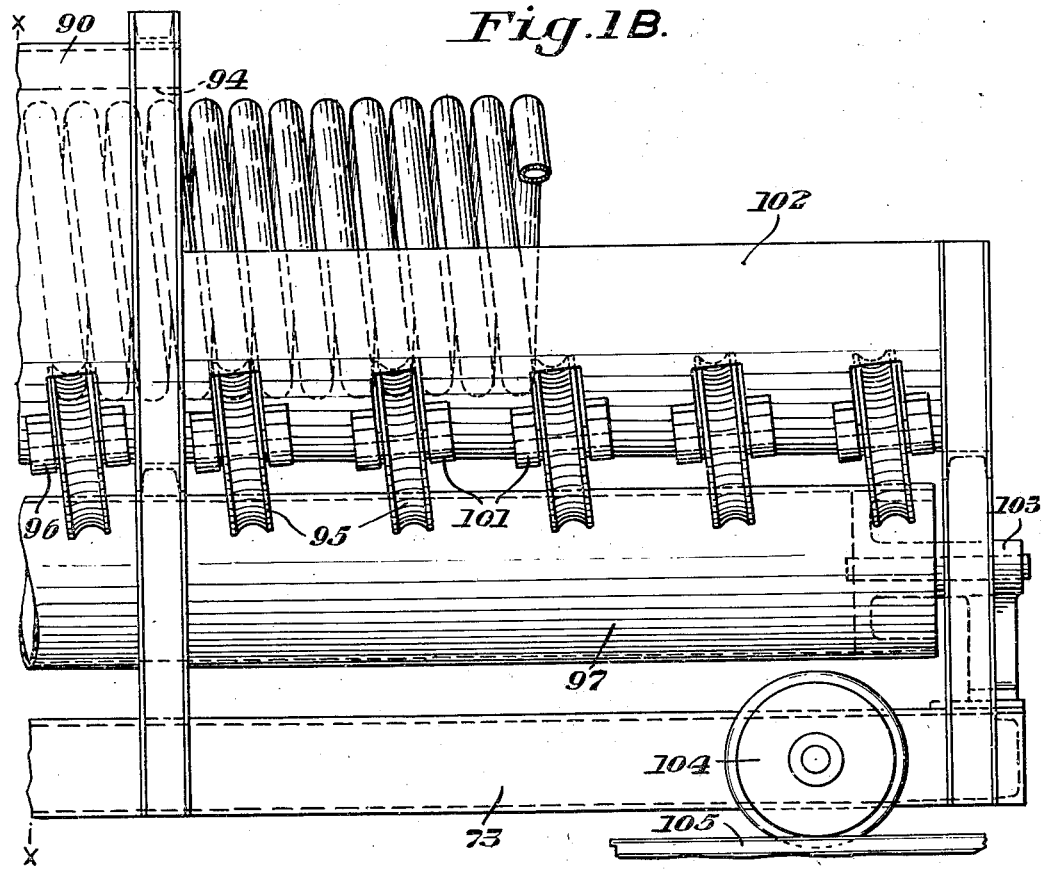
Fig. 1B is a partial elevational view showing the discharge end of the lehr and the conveying apparatus extending beyond the lehr.

In the apparatus illustrated in the drawings the glass is melted in a glass melting tank (not shown) and then passes to the forehearth 2, having a discharge outlet 3 through which the glass is discharged to the ware-making apparatus. The forehearth is provided with a distributor 4 surrounding the discharge outlet which uniformly distributes the molten glass around the opening so that it will flow uniformly downwardly through the outlet. This distributor is more fully shown and described in my copending application Serial No. 380,179, now Patent No. 2,390,925 and hence will not be described in detail here.

The glass, after passing through the outlet in the forehearth, passes through an opening 5 centrally disposed in the block 6 mounted beneath the opening 3, the opening 5 being in alignment with the outlet 3. The block 6 carries lugs 7 and pins 8 which are arranged to cooperate with screws 9 for holding the block against the bottom of the forehearth. The screws 9 are threaded in a downwardly projecting flange 10 carried by the framework 11 of the furnace.

The glass, after passing through the opening 5, is received by the shaping element 12 which is positioned below the outlet. The shaping element 12 may be of any desired form, but, as illustrated, it is made up of a plurality of circular shells 13 positioned one within the other and a block 14 which is positioned within the innermost shell. The shells 13 are supported from the block 14 by a plurality of rods 15, the inner ends of which are mounted in the block 14 and which extend radially through suitable openings in the shells. The lower ends of these shells preferably terminate in the same horizontal plane so as to provide a plurality of openings through which the glass is discharged, these openings terminating in the same plane. The outer shell preferably extends vertically beyond the upper ends of the remaining shells, the extension 16 extending into a circular recess 17 in the block 6. This assures proper distribution of the molten glass over the upper end of the shaping element and, consequently, the proper flow of the glass over the shaping element.

The block 14 is threaded on the lower end of the blow pipe 18 which extends upwardly through the opening 5, the outlet 3 and the distributor 4 and through an opening 19 in the top wall of the forehearth. The blow pipe is supported on a supporting plate 20 carried by framework 21. As the blow pipe extends upwardly through the molten glass and hot atmosphere in the forehearth, it is shielded by a refractory sleeve 22 which extends from the top of the forehearth to the lower end of the outlet 3. Below the outlet 3 the sleeve 22 rests upon a collar 23 which surrounds the blow pipe, and this collar in turn rests upon the block 14. Pins 24 extend radially of the collar 23 and serve to center the blow pipe with respect to the outlet in the forehearth and the opening through the block 6.

The block 14 is not uniform in cross section, the wall thereof being heavier or thicker on one side than on the other. Both the inner and outer faces are circular, but these faces are not concentric. The outer shell of the shaping element is concentric with the blow pipe, but the intermediate shells are not concentric with the blow pipe as they are spaced relative to each other and relative to the inner block 14 and the outer ring 13; and, since the cross section of the inner block 14 is not uniform but is thicker on one side than on the other, the spacing between the shells is less on one side than on the other. The distance between the shells and between the inner block and the shells progressively increases throughout one-half of the distance around the shaping element and progressively decreases throughout the remaining half back to the point where the spacing is at a minimum. This arrangement of the shells and the supporting member causes a greater amount of molten glass to pass through the shells on one side thereof than on the other and causes the preliminarily formed ware to be of nonuniform wall thickness. Looking at the apparatus as it is shown in Fig. 1, the spacing of the shells appears to be uniform, but this is due to the fact that the shells are there shown on that diameter where they are spaced equally. However, in Fig. 2, which is taken at 90° to the view of Fig. 1, the spacing of the shells is shown. It is also shown in Fig. 8. The shells are spaced in such a way that the wall thickness is greatest in that portion of the ware forming the outermost portion of the turns of the spiral.

A circular shell 30, pipes 31 and 32 and the hollow shell 33 form a forming chamber 34 partially surrounding the shaping element and the glass as it passes beyond the shaping element. A hollow ring 35 extends around the upper end of the forming chamber and around the shaping element and in close proximity to the forehearth. This ring is preferably faced with an asbestos ring 36. It is provided with a water inlet 37 and a water outlet 38 so that cooling water can be passed through it. The hollow shield 33 is likewise provided with an inlet 39 and an outlet 40 for passing cooling fluid through the shield. This shield is provided with an insulating facing 41. This cooling arrangement is not utilized primarily to effect a cooling of the glass but is for the purpose of shielding the workmen against the heat of the forehearth and the downwardly flowing molten glass. The pipes 31 and 32 are circular and are connected respectively to pipes 42 and 43 for supplying gas thereto. These pipes 31 and 32 have openings 44 and 45 therein through which the gas escapes and is projected against the downwardly moving, preliminarily formed glass. The gas may be a combustible one so that the preliminarily formed ware may be heated or, depending upon the particular operating conditions, it may be a cooling gas for cooling the glass passing through the forming chamber 34.

The shields 30 and 33 and the pipes 31 and 32 are suitably supported on the framework by threaded rods 46 which cooperate with lugs 47. These lugs are bored and the rods 46 extend therethrough and the lugs are held in any adjusted position by the nuts 48 which are threaded on the rods. The hollow ring 35 is carried on plates 49 which are bored for cooperation with rods 50 carried by the framework. The rods 50 are threaded and the nuts 51 which are threaded on the rods hold the plates and the ring in any suitable adjusted position. This arrangement permits the hollow ring to be raised or lowered to increase or decrease the space 52 at the upper end of the forming chamber. This gives a control over the flow of gases upwardly through the forming chamber 34. After the preliminarily formed tube passes through the forming chamber it continues downwardly and passes over a curved sizing member or transformer 60 having an end plate 60a secured thereto by welding. This curved sizing member is the lower end of a tube 61, that end of the tube being coated or covered with a sleeve 62 of graphite or some other suitable similar material. The upper end of the sizing member is straight, but it curves near the center thereof and the curve is toward the drum on which the tube is to be spirally wound. The tube 61 extends vertically through the preliminarily formed ware and upwardly through the blow pipe 18 and is connected to a T 63 at its upper end. The T is connected to a tube 63a through which the cooling water which passes through the sizing member is discharged. Disposed within the pipe 61 is a tube 64, and this tube extends upwardly through the blow pipe and to a point beyond the T 63 and is connected to a flexible pipe 65 which is connected to another pipe 66 which in turn is connected to a water supply. The tube 64 extends downwardly to within the sizer and supplies water to the sizer, the water then passing upwardly between the inner wall of the pipe 61 and the wall of the tube 64 and being discharged in the manner described.

While considering this structure, it should be pointed out that the blow pipe 18 at its upper end is connected to a T 67 which is connected to a flexible tube 68 which in turn is connected to a pipe 69 for supplying the blowing air to the system.

As the glass passes over the sizing member 60, it may be desirable to heat it to some extent and, accordingly, a burner 70 is provided at this point, the burner being connected to a suitable source of gas supply by a pipe 71.

Figure 3:
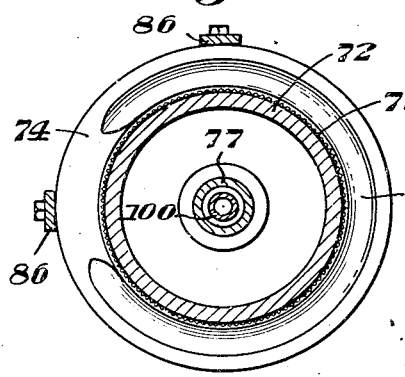
Fig. 3 is a vertical section taken along the line III—III of Fig. 1.

The glass is curved as it passes over the sizer in order to facilitate the winding of it on a drum 72 mounted on the movable carriage 73. The tube is brought into proper position on the drum 72 by the sizing member and a cam 74. The cam 74 (illustrated in detail in Fig. 3) is provided with a groove 75 in the front face thereof. This cam and the groove therein are arranged so that the tube will be wound spirally on the drum. As is apparent from Fig. 1, the top portion of the cam projects forwardly along the drum to an appreciably greater extent than the lower portion of the cam, and also the groove 75 therein progresses in depth from one end to the other. The cam 74 is in the form of a ring and is preferably hollow so that, if desired, a cooling fluid can be passed therethrough in order to further cool tubing as it is wound on the drum.

Figure 6:
Fig. 6 is a sectional view taken along the line VI—VI of Fig. 5.

A portion of the outer surface of the hollow drum 72 is ridged or grooved in order to provide some friction between the tube and the drum so as to prevent slippage and pull the glass over the sizer and wind it on the drum. These grooves or ridges need not extend throughout the length of the drum as they preferably extend only a short distance along the drum from the end where the tube first comes in contact with it. These grooves or ridges 76 preferably decrease in height or depth from the left-hand end of the drum toward the center of the drum, as illustrated in Fig. 6.

The drum is mounted on a hollow shaft 77 which is supported in the journal 78 carried by the upstanding framework 79 of the movable carriage 73. The shaft 77 carries a sprocket wheel 80 which is driven by a chain 81, sprocket wheel 82 and the shaft 83. The shaft 83 is driven by a motor 84 through the belt 84a and the gear reducer 84b.

The cam 74 described above is supported on the upstanding framework of the carriage.

Figure 4:
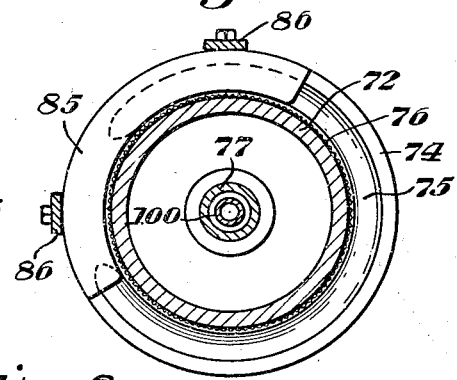
Fig. 4 is a vertical section taken along the line IV—IV of Fig. 1.
Figure 5:
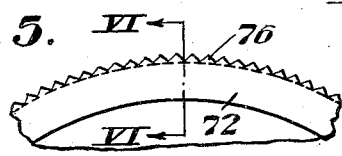
Fig. 5 is a partial end elevation of the drum on which the tubing is wound and showing the grooves or ribs for providing friction between the tubing and the drum.

The cam and rotatable drum just described cause the tube to be wound spirally and to advance along the drum as it is rotated. In order to keep the turns of the spirally wound tubing properly spaced and to assist in and advance along the drum, spacing and advancing bars 85 are mounted adjacent the drum. These bars are supported on cross members 86 which are carried by the cam 74. The spacing and advancing bars 85 need not extend completely throughout the periphery of the drum. It is only necessary that they extend spirally around the drum throughout a relatively short distance. As is shown in Fig. 4, they extend approximately one-third of the distance around the drum. These bars, of course, are preferably spaced from the drum so as to not interfere with the rotation thereof. If it is desired to form spiral tubing in which the turns are not separated from each other in the manner illustrated in Fig. 9, these spacing and advancing bars may be dispensed with. In that event, the turns may come in contact with each other so as to form either a closely wound or a fused integral spiral.

The spiral tubing moves over the rotating drum 72 and is preferably discharged therefrom into a lehr 90 formed of a metal casing 91 and insulation 92. This lehr is preferably cylindrical and the tubing enters the one end through an opening 93. It passes continuously through the lehr and is discharged at the other end through a discharge opening 94. During its passage through the lehr the tubing is supported on a plurality of spaced inclined rolls 95. These rolls are carried in bearing brackets 96 which are secured to the shell of the lehr, the rolls extending into the lehr through suitable slots in the side wall of the lehr. The supporting rolls are driven through friction by a rotatable shell 97 positioned below the lehr. The shell 97 is driven by a shaft 98 journalled in a bearing 99 carried by the framework of the carriage, the shaft being driven by the motor 84 through the belt 84a and the gear reducer 84b.

In the embodiment shown in the drawings the rolls 95 have concave surfaces but flat rolls also can be used. These rolls not only serve to support the spiral tubing but they serve as a conveyor. Due to the fact that the tubing in spiral form has become substantially set by the time it enters the lehr, the rolls exert a pulling force, tending to pull the tubing off the winding drum and advance it through the lehr.

A tube 100 extends through the hollow shaft of the drum and into the lehr for supplying a combustible gas to the lehr. During the passage of the tubing through the lehr it is suitably annealed to relieve it of any objectionable strains.

After the tubing passes from the lehr it is carried forwardly by additional conveyor rolls 95 which are journalled in bearings 101 carried by the shell 102. These rolls are driven by the driving cylinder 97 as it extends forwardly beyond the lehr, the front end of the cylinder being journalled in a bearing 103 carried by the upstanding framework on the carriage 73.

The carriage 73 is mounted on wheels 104 which are adapted to run on a track 105 so that the entire unit just described can readily be moved from beneath the forehearth of the furnace in order to permit work to be done in the neighborhood of the shaping element and the outlet from the forehearth.

The spiral tubing may be cut in any suitable lengths by a cutting tool positioned adjacent the conveying mechanism just described. The cutting can be carried out while the tubing passes along the conveying mechanism after leaving the lehr or it can be performed at the end of the conveyor or after the glass has passed beyond the conveyor. It may be cut into lengths such as that illustrated in Fig. 9 or it may be cut into individual rings as illustrated in Figs. 10 and 11, the rings being subjected to heat and flattened. The type of spiral structure illustrated in Fig. 9 is especially adapted to fluorescent lighting and many other uses.

It will be readily apparent from what has been stated above that spiral glass tubing can be manufactured direct from the molten metal and that spiral tubing of any suitable diameter can be made; that is, the diameter of the tubing itself may vary over a wide range. Also the diameter of the spiral may be varied over a wide range by changing the drum and other associated parts of the winding apparatus in proportion to the diameter of the spiral desired. The changes in the sizes of the various parts will be evident to those skilled in the art and from what is shown in the drawings and stated herein. It will also be apparent that by providing for the wall thickness to vary in the preliminarily formed ware a product having a uniform wall thickness can be obtained despite the thinning action caused in the outer periphery by the bending of the tubing. Also it will be apparent that with this apparatus spiral tubing can be manufactured at a relatively high rate of speed.

While in the embodiment shown a sizer is employed, it will be apparent to those skilled in this art that in the drawing of smaller diameter tubing a sizer will neither be necessary nor desirable.

While I have shown a preferred embodiment of my invention, it will be understood that it may be otherwise embodied within the scope of the appended claims.

I claim:

1. Apparatus for the continuous manufacture of glass tubing in spiral form comprising a source of molten glass, a shaping element positioned to receive molten glass from said source and to preliminarily shape it into tubular form, a drum positioned to receive the preliminarily shaped tube, means for rotating the drum, stationary means cooperating with the drum for causing the shaped tube to be wound in spiral form thereon as the drum is rotated, said drum having friction means at the tube receiving end for providing friction between the tube and the drum as it is wound thereon, and conveying means for receiving the spirally shaped tube as it is continuously discharged from the other end of said drum.

2. Apparatus for the continuous manufacture of glass tubing in spiral form comprising a source of molten glass, a shaping element positioned to receive molten glass from said source and to preliminarily shape it into tubular form, a drum positioned to receive the preliminarily shaped tubing, means for rotating the drum, said drum having friction means at least at the receiving end for providing friction between the drum and the tube as the tube is spirally wound thereon, a cam cooperating with said drum for positioning the tube thereon and for advancing it thereover as the drum is rotated, stationary spacing members for spacing the turns of the tube on the drum, a lehr, and conveying means for receiving the formed tube as it is discharged from the drum and for conveying it through the lehr.

3. Apparatus for continuously manufacturing glass tubing in spiral form comprising a source source of molten glass, a shaping element positioned to receive molten glass from said source and arranged to preliminarily shape it into tubular ware form, a curved sizing member, means for supporting the sizing member within the preliminarily shaped tube, a drum adjacent the sizer for receiving the tube as it is discharged from the sizer, means cooperating with the drum for spirally winding the tube thereon and for advancing it along the drum, and means for receiving the spirally shaped tube as it is continuously discharged from said drum.

4. Apparatus for continuously manufacturing glass tubing in spiral form comprising a source of molten glass, means for forming a downwardly flowing stream of glass from said source, a shaping element, means for supporting the shaping element in said stream, said element being adapted to shape the molten glass into tubular form, said shaping element being formed of a plurality of members offset with respect to each other to form a tube of nonuniform wall thickness, a drum for receiving the tube, means cooperating with the drum for spirally winding the tube thereon, and conveying means for receiving the spirally shaped tube as it is continuously discharged from said drum.

5. Apparatus for continuously manufacturing glass tubing in spiral form comprising a source of molten glass, means for forming a downwardly flowing stream of glass from said source, a shaping element, means for supporting the shaping element in said stream, said element being adapted to shape the molten glass into tubular form having a wall thicker on one side than on the other, a drum for receiving the preliminarily shaped tube, means cooperating with the drum for spirally winding the tube thereon, the heavier portion of the wall forming the outer portion of the spirally shaped tube, and conveying means for receiving the spirally shaped tube as it is continuously discharged from the drum.

6. Apparatus for continuously manufacturing glass tubing in spiral form comprising a source of molten glass, means for forming a downwardly flowing stream of glass from said source, a shaping element, means for supporting the shaping element in said stream of molten glass, said shaping element being adapted to preliminarily shape the stream into tubular form, a curved sizing member, means for supporting the curved sizing member within the preliminarily shaped tube for sizing it and curving it to facilitate the forming of it into a spiral, a drum adjacent the sizing member for receiving the preliminarily shaped tube after it has passed over the sizer, means cooperating with the drum for spirally winding the tube thereon and for causing it to move thereover, and conveying means for receiving the spirally shaped tube as it is discharged from said drum.

7. Apparatus for continuously manufacturing glass tubing in spiral form comprising a source of molten glass, means for forming a downwardly flowing stream of glass from said source, a shaping element, means for supporting the shaping element in said stream of molten glass, said shaping element being adapted to preliminarily shape the stream into tubing of nonuniform wall thickness, a curved sizing member, means for supporting the curved sizing member within the tube, a drum for receiving the preliminarily shaped tube, means for rotating the drum as the tube is fed to it from the sizing member, stationary means cooperating with the drum for spirally winding the shaped tube thereon and for moving it thereover, said drum having friction means for providing friction between the drum and the tube, a lehr for receiving the spirally shaped tube as it is discharged from the drum, means extending longitudinally through said drum for supplying heat to said lehr, and conveying means for moving the spirally shaped tube through the lehr.

8. Apparatus for continuously manufacturing glass tubing in spiral form comprising a source of molten glass, means for forming a downwardly flowing stream of glass from said source, a shaping element, means for supporting the shaping element in said stream of molten glass, said shaping element being adapted to preliminarily shape the stream into tubing of nonuniform wall thickness, a curved sizing member, means for supporting the curved sizing member within the tube, a drum for receiving the preliminarily shaped tube, means for rotating the drum as the tube is fed to it from the sizing member, stationary means cooperating with the drum for spirally winding the tube thereon and for moving it thereover, said drum having friction means for providing friction between the drum and the tube, cooling means adjacent the drum for cooling the tube as it is wound thereon, a lehr for receiving the spirally shaped tube discharged from the drum, and means for moving the spirally shaped tube through the lehr.

9. Apparatus for continuously manufacturing glass tubing in spiral form comprising a source of molten glass, means for forming a downwardly flowing stream of glass from said source, a shaping element, means for supporting the shaping element in said stream of molten glass, said shaping element being adapted to preliminarily shape the stream into tubing of nonuniform wall thickness, a curved sizing member, means for supporting the curved sizing member within the tube, a drum for receiving the preliminarily shaped tube as it leaves the sizing member, means for rotating the drum as the tube is fed to it from the sizing member, stationary means cooperating with the drum for spirally winding the tube thereon and for moving it thereover, said drum having friction means for providing friction between the drum and the tube, means for heating the tube as it passes over said sizing member, means for cooling the tube as it is wound on said drum, a lehr for receiving the spirally shaped tube discharged from the drum, and means for moving the tube through the lehr.

10. Apparatus for continuously manufacturing glass tubing in spiral form comprising a source of molten glass, means for forming a downwardly flowing stream of glass from said source, a shaping element, means for supporting the shaping element in said stream of molten glass, said shaping element being adapted to preliminarily shape the stream into tubular form, a drum positioned to receive the preliminarily shaped tube, means adjacent the drum for imparting a curvature to the tube while it is in a deformable condition and prior to its being received by the drum, means for rotating the drum, a cam cooperating with the drum for causing the tube to be wound in spiral form thereon as it is rotated, said drum being provided with friction means for providing friction between the tube and the drum as the tube is wound thereon, means for heating the glass as it is operated upon by said curving means, cooling means for cooling the tube as it is wound on the drum, and supporting and conveying means for receiving the spirally shaped tube as it is discharged from the drum and for conveying it away from the drum.

11. Apparatus for continuously manufacturing glass tubing in spiral form comprising a source of molten glass, means for forming a downwardly flowing stream of glass from said source, a shaping element, means for supporting the shaping element in said stream of glass, said shaping element being adapted to preliminarily shape the stream into tubing, said shaping element having spaced members offset with respect to each other so as to form tubing having a nonuniform wall thickness, the wall thickness on one side being appreciably greater than the wall thickness on the other side, and means for receiving the preliminarily shaped tubing and for spiralling it with the heavier wall thickness forming the outer portion of the spiral.

12. Apparatus for continuously manufacturing glass tubing in spiral form comprising a source of molten glass, means for forming a downwardly flowing stream of glass from said source, a shaping element, means for supporting the shaping element in said stream of glass, said shaping element being adapted to preliminarily shape the stream into tubing, said shaping element having spaced members offset with respect to each other so as to form tubing having a nonuniform wall thickness, the wall thickness on one side being appreciably greater than the wall thickness on the other side, and means for receiving the preliminarily shaped tubing for spiralling it with the heavier wall thickness forming the outer portion of the spiral, said tubing during the spiralling thereof being stretched to substantially equalize the wall thickness.

13. Apparatus for the continuous manufacture of glass tubing in spiral form comprising a source of molten glass, means for forming a downwardly flowing stream of glass from said source, a shaping element, means for supporting the shaping element in said stream of molten glass, said shaping element comprising a plurality of substantially cylindrical shells positioned one within the other but having their axes offset with respect to each other to provide a nonuniform wall thickness in the tube shaped by the passage of molten glass thereover, a drum positioned to receive the preliminarily shaped tube, means for rotating the drum, and means cooperating with the drum for advancing the tube over said drum as it is wound thereon in spiral form.

14. Apparatus for continuously manufacturing tubing in spiral form comprising a source of molten glass, means for forming a downwardly flowing stream of glass from said source, a shaping element for preliminarily shaping the molten glass into tubular ware form, means for supporting the shaping element in said stream of molten glass, a sizing element, means for supporting the sizing element below the shaping element and within the tubular ware, and means including a rotatable drum for drawing the tubular ware over the sizing member and for winding it into spiral form on the drum.

EDWARD DANNER.

REFERENCES CITED

The following references are of record in the file of this patent:

UNITED STATES PATENTS

| Number | Name | Date |
|---|---|---|
| 1,750,971 | Soubier | Mar. 18, 1930 |
| 1,926,905 | Le Coultre | Sept. 12, 1933 |
| 2,296,321 | Wellech | Sept. 22, 1942 |
| 2,390,925 | Danner | Dec. 11, 1945 |
| 2,396,254 | Everett | Mar. 12, 1946 |

Certificate of Correction

February 22, 1949.

Patent No. 2,462,808.

EDWARD DANNER

It is hereby certified that error appears in the printed specification of the above numbered patent requiring correction as follows:

Column 7, line 55, claim 3, strike out the word "source", second occurrence; and that the said Letters Patent should be read with this correction therein that the same may conform to the record of the case in the Patent Office.

Signed and sealed this 16th day of August, A. D. 1949.

[SEAL]

THOMAS F. MURPHY,
*Assistant Commissioner of Patents.*